Sept. 1, 1925.

J. W. BISHOP 1,552,203

BOWLING ALLEY PIN SPOT

Filed April 15, 1925

Inventor:
Joseph W. Bishop
By: Wm. O. Bell
Atty.

Patented Sept. 1, 1925.

1,552,203

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

BOWLING-ALLEY PIN SPOT.

Application filed April 15, 1925. Serial No. 23,185.

*To all whom it may concern:*

Be it known that I, JOSEPH W. BISHOP, a citizen of the United States, residing at Muskegon, in the county of Muskegon and State of Michigan, have invented certain new and useful Improvements in Bowling-Alley Pin Spots, of which the following is a specification.

This invention relates to bowling alleys and particularly to the pin spots thereon, and its object is to provide a pin spot which will lessen the noise and reduce the wear on the base of the pin and which can be easily installed and replaced.

In the accompanying drawings illustrating the invention.

Figure 1:
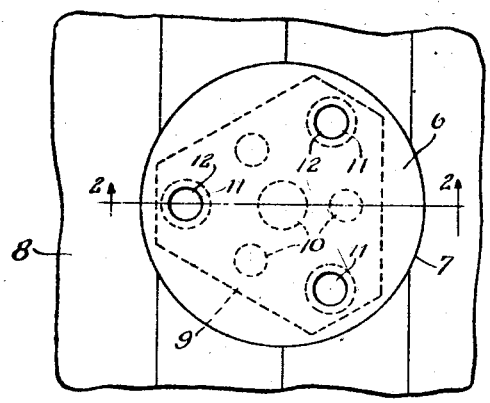
Fig. 1 is a plan view.
Figure 2:
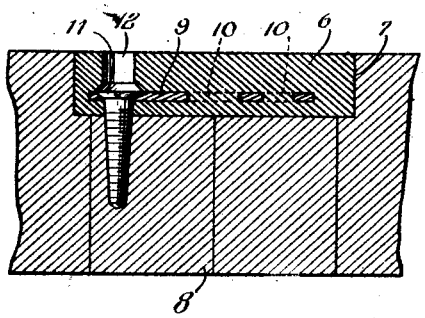
Fig. 2 is a sectional view showing one type of a pin spot embodying the invention.

In Figs. 1 and 2 I have shown a pin spot which consists of a circular disk head 6 seated in a recess 7 in the alley bed 8 and having a perforated holding plate 9 embedded therein and provided with openings 10 to permit the material of which the spot is made to run therethrough for better anchoring the plate in the head. This spot is secured in the bed by screws 11 which are arranged in openings 12 in the head and engage the plate and are screwed into the alley bed.

Figure 3:
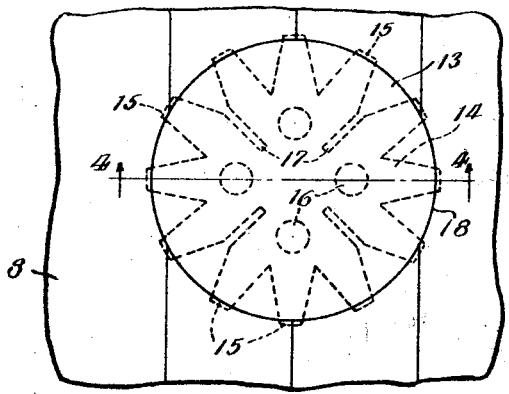
Fig. 3 is a plan view and Fig. 4 is a sectional view showing another type of pin spot embodying the invention.
Figure 4:
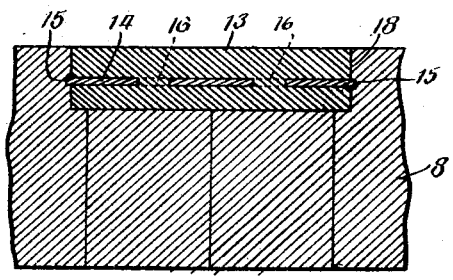
Figure 5:
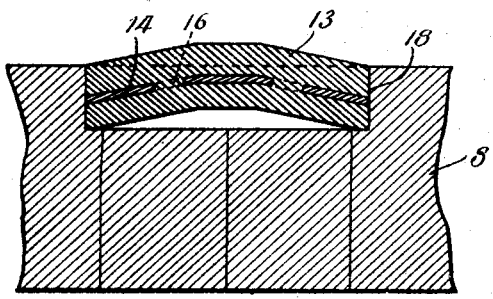
Fig. 5 is a sectional view showing how the pin spot of Figs. 3 and 4 is placed in the recess of the alley bed preliminary to being secured therein.

In Figs. 3, 4 and 5 I have shown another type of spot which comprises a circular disk head 13 having a holding plate 14 embedded therein and provided with a plurality of radially disposed prongs 15 and with openings 16 and slits 17 therein to permit the passage of material of which the spot is made to better anchor the plate in the head. This spot is made arched, as shown in Fig. 5, the plate also being arched, and with the outer ends of the prongs flush or substantially flush with the side wall of the head so that the spot can be easily arranged in the recess 18 in the alley bed. Then a hammer blow is struck upon the top of the spot, centrally thereof, which flattens out the spot from the position shown in Fig. 5 to that shown in Fig. 4, and at the same time drives the ends of the prongs into the alley bed, as shown in Figs. 3 and 4 to secure the spot in the alley bed without the use of screws or other loose fastening means.

I prefer to make the pin spot out of rubber which is not hard and is not soft, but is approximately midway between hard and soft, and similar to soft tough stock of which rubber tires are made. The stock must be sufficiently hard to resist wear and to hold the pins upright, but at the same time I wish to make it sufficiently soft to reduce and practically eliminate the noise incident to spotting the pins, and also to prevent wear on the base of the pins.

I have found in practice that rubber pin spots in accordance with my invention are advantageous in many respects, and serve their purpose with entire satisfaction. They are easily inserted and can easily be removed for replacement. When it becomes necessary to replace the spot 13 of Figs. 3-4 a tool can be forced down through the rubber and through an opening in the holding plate to engage the plate, whereby the spot can be pulled out of the recess, since it is then immaterial how much damage is done to the spot to be replaced. Under ordinary conditions a rubber spot will last for a long time, and it will save the pin from a great deal of wear on its base, where pins wear rapidly under most favorable conditions.

These spots are intended principally for use in those alley beds which are merely recessed to receive the spots and not for use in those alley beds which are also bored for pin setting devices. The spots disclosed in my companion application are designed particularly for use in alley beds which have been recessed and bored. However, the spots of this application can be used, if desired, in alley beds which have been recessed and bored because they have considerable rigidity and will serve their purpose under such conditions for a considerable period of time. But the best results with these spots are obtained of course, when they are provided with a substantial support by the solid alley bed thereunder, as shown in the drawings.

I have illustrated the invention in forms which I have found to be satisfactory for the purpose, but I appreciate the fact that changes may be made therein without departing from the spirit or sacrificing the advantages of the invention, and I reserve the right to make all such changes as fairly fall within the scope of the following claims.

I claim:

1. A bowling alley pin spot made of comparatively soft tough rubber stock.

2. A bowling alley pin spot made of comparatively soft tough rubber stock and having means therein for securing the spot to a bowling alley bed.

3. A bowling alley pin spot made of comparatively soft tough rubber stock and having a plate embedded therein.

4. A bowling alley pin spot made of comparatively soft tough rubber stock and having a plate embedded therein, and means cooperating with the plate and adapted to engage an alley bed for securing the spot in place in the bed.

5. A bowling alley pin spot made of comparatively soft tough rubber stock and having a plate embedded therein, said pin spot and plate being arched and said plate having radially projecting prongs terminating at the side wall of the spot, whereby when said spot is arranged in a recess adapted to receive it and is flattened down in said recess by a blow on the top thereof, the prongs will be projected into the wall of the recess to hold the spot therein.

6. The combination of a bowling alley pin spot made of comparatively soft tough rubber stock and having a plate embedded therein, said spot and plate being arched and the plate having radially projecting prongs, and a bowling alley bed having a recess adapted to receive the spot, whereby when the spot is flattened in the recess by a blow on the top thereof the prongs will be projected into the wall of the recess to secure the spot in place.

JOSEPH W. BISHOP.